United States Patent
Mattheijssen et al.

(10) Patent No.: US 12,184,370 B2
(45) Date of Patent: *Dec. 31, 2024

(54) ANTENNA SYSTEM AND METHOD OF OPERATING AN ANTENNA SYSTEM

(71) Applicant: NXP B.V., Eindhoven (NL)

(72) Inventors: Paul Mattheijssen, Boxtel (NL); Konstantinos Doris, Amsterdam (NL); Dominicus Martinus Wilhelmus Leenaerts, Riethoven (NL); Mark Tomesen, Wychen (NL)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,907

(22) Filed: May 12, 2023

(65) Prior Publication Data

US 2023/0283339 A1 Sep. 7, 2023

Related U.S. Application Data

(63) Continuation of application No. 17/314,667, filed on May 7, 2021, now Pat. No. 11,689,265.

(30) Foreign Application Priority Data

May 14, 2020 (EP) .................................... 20174731

(51) Int. Cl.
| | | |
|---|---|---|
| *H04B 7/06* | (2006.01) | |
| *G01S 7/00* | (2006.01) | |
| *G01S 7/02* | (2006.01) | |
| *G01S 13/00* | (2006.01) | |
| *H01Q 1/24* | (2006.01) | |
| *H01Q 21/06* | (2006.01) | |
| *H01Q 21/24* | (2006.01) | |

(52) U.S. Cl.
CPC ............ *H04B 7/0617* (2013.01); *G01S 7/006* (2013.01); *G01S 7/024* (2013.01); *G01S 13/003* (2013.01); *H01Q 1/246* (2013.01); *H01Q 21/065* (2013.01); *H01Q 21/24* (2013.01)

(58) Field of Classification Search
CPC ....... H04B 7/0617; G01S 7/006; G01S 7/024; G01S 13/003; H01Q 1/246; H01Q 21/065; H01Q 21/24
USPC ......................................................... 375/267
See application file for complete search history.

(56) References Cited

U.S. PATENT DOCUMENTS

| | | | | |
|---|---|---|---|---|
| 2009/0207093 | A1* | 8/2009 | Anreddy | H04B 7/0805 343/893 |
| 2017/0062933 | A1* | 3/2017 | Wu | H01Q 9/0407 |
| 2018/0210079 | A1* | 7/2018 | Hammerschmidt | G01S 13/931 |

FOREIGN PATENT DOCUMENTS

KR 20170077092 * 7/2017

OTHER PUBLICATIONS

U.S. Appl. No. 17/314,477 NFOA dated Jun. 25, 2023, 28 pages.

* cited by examiner

*Primary Examiner* — Leila Malek

(57) ABSTRACT

An antenna system for a mobile communications base station and a method of operating a communications network including a base station is described. The antenna system includes an antenna array for beamforming and is configured either as a radar sensor, a communications antenna or a combined radar sensor. A radar image may be used to determine a map of objects in the vicinity of the antenna system and to adapt the beamsteering or beamforming of the antenna system.

15 Claims, 18 Drawing Sheets

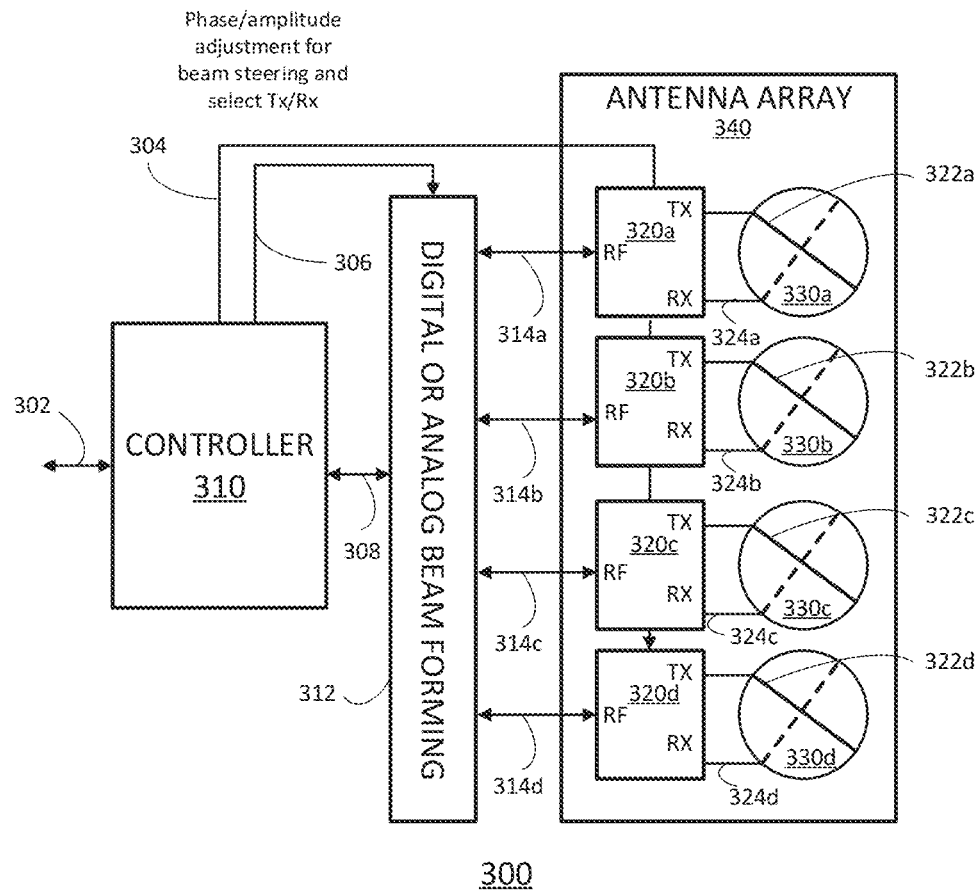
FIG. 10A
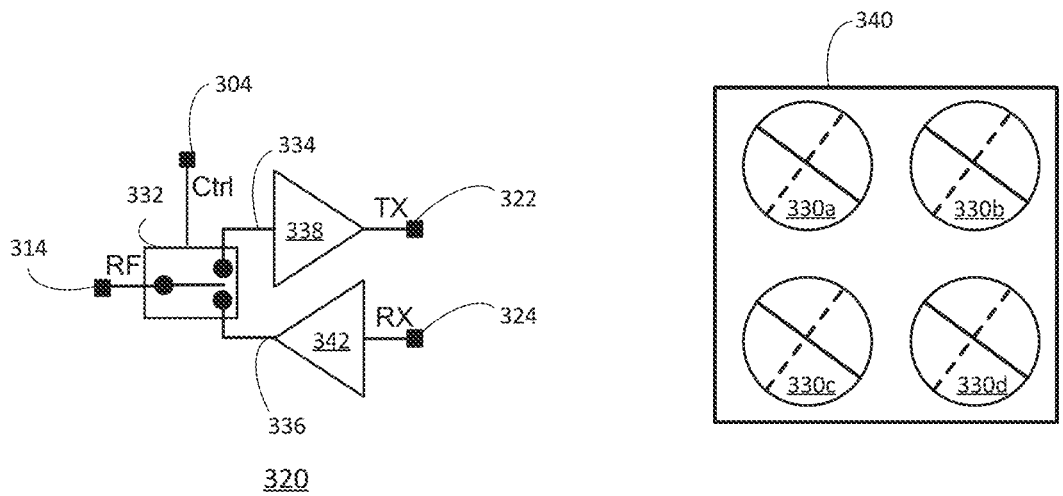
FIG. 10B
FIG. 10C

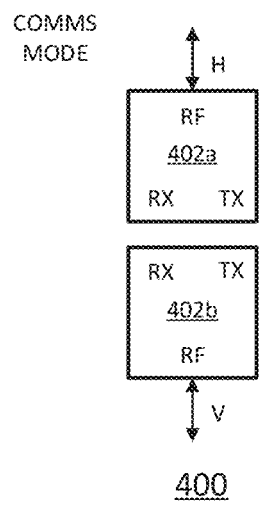 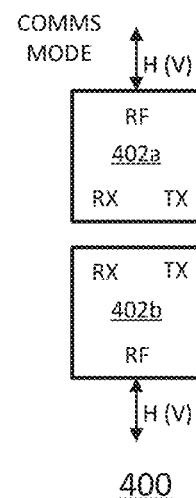 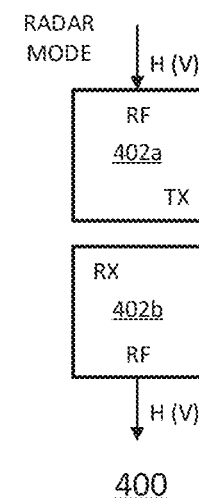
FIG. 12A  FIG. 12B  FIG. 12C
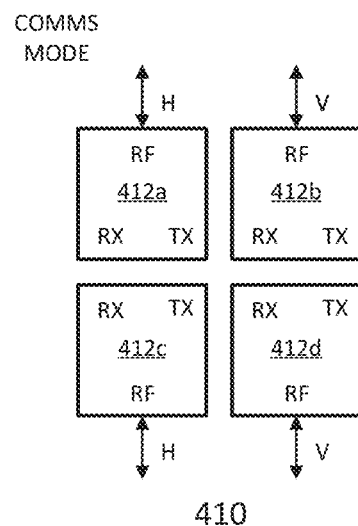 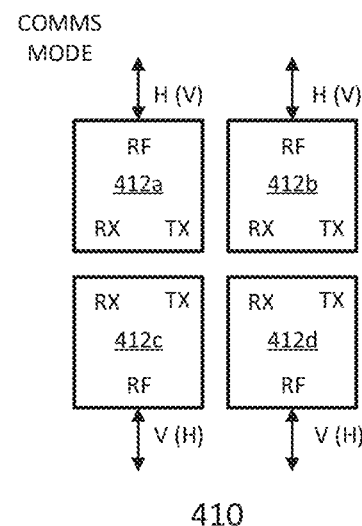
FIG. 13A  FIG. 13B

ANTENNA SYSTEM AND METHOD OF OPERATING AN ANTENNA SYSTEM

CROSS-REFERENCE TO RELATED APPLICATIONS

This application is a continuation of co-pending U.S. patent application Ser. No. 17/314,667, filed May 7, 2021, which claims priority under 35 U.S.C. § 119 to European Patent Application No. 20174731.8, filed May 14, 2020, the contents of each of which are incorporated by reference herein.

FIELD

This disclosure relates to an antenna system for a mobile communications network base station and a method for operating a mobile communications network including a base station.

BACKGROUND

Mobile communications cellular networks such as networks supporting 4G or 5G mobile communications standards may use base transceiver stations (BTS) or base stations including antenna systems which support multiple-input multiple output (MIMO) communications using beamforming techniques to improve the network capacity and coverage.

These antenna systems include an array of antennas, typically implemented as patch antennas arranged in a regular rectangular grid. The pitch or spacing of the patch antennas is determined by the wavelength of the communications frequency used in transmission or reception. The patch antennas may be dual-polarised antennas which have orthogonal polarisation to improve antenna diversity and allow the doubling of antenna elements for a given area.

In operation, beamforming and/or beam-steering is used both in transmit mode to focus the direction of the transmitted RF signal towards another BTS or a user equipment receiver (UE) for example a mobile phone and in receive mode to improve the sensitivity of a signal transmitted from a user equipment transmitter.

Beamforming requires two or more antennas to be operated in either transmit (TX) or receive (RX) mode. In transmit mode the phase and amplitude of the signal is adjusted for each of the relevant antenna to form the desired beam direction. In receive mode, the received signals from multiple antenna patches are combined using signal processing techniques to selectively receive signals from a desired beam direction and suppress unwanted signals The antenna systems can be configured to use different numbers of patch antennas in transmit and receive modes. In transmit mode this results in a trade-off between the power of the transmitted signal and the narrowness of the transmitted beam. Using more patch antennas results in a higher power and narrower beam. In receive mode using more patch antennas results in greater sensitivity in a particular direction and a narrower beam.

Such antenna systems can be used to form numbers of communication channels between different user equipment and the rest of the mobile communications network. In 5G communication standards time division duplex (TDD) is used for communication over a channel. In TDD the same frequency is used for transmission and reception.

SUMMARY

Aspects of the disclosure are defined in the accompanying claims.

In a first aspect there is provided an antenna system for a mobile communications network base station, the antenna system comprising: an antenna array for beamforming, the antenna array comprising at least one of a plurality of dual-polarized patch antennas and plurality of waveguide antennas and a controller coupled to the antenna array for configuring each antenna to transmit or receive the RF signal; wherein the controller is operable to: (i) configure at least two antennas of the plurality of antennas to transmit and/or receive an RF communication signal and to configure at least one antenna of the plurality of antennas to transmit a radar signal and one antenna of the plurality of antennas to receive the reflected radar signal, or (ii) configure at least two antennas of the plurality of antennas to transmit and/or receive an RF communication signal in a first mode and to configure at least one antenna of the plurality of antennas to transmit a radar signal and at least one further antenna of the plurality of antennas to receive the reflected radar signal in a second mode.

In some embodiments, the antenna array comprises two patch antennas and wherein the controller is operable in a first mode to configure the first patch antenna in a first polarization and the second patch antenna in a second polarization and to either receive a communication signal detected via the first and second patch antennas or to transmit a communication signal via the first and second patch antennas.

In some embodiments, the antenna array comprises two patch antennas and wherein the controller is operable in a first mode to configure the first patch antenna and the second patch antenna in one of a first polarization and a second polarization and to either receive a communication signal detected via the first and second patch antennas or to transmit a communication signal via the first and second patch antennas.

In some embodiments, the antenna array comprises two patch antennas and wherein the controller is operable in a second mode to configure the first patch antenna in the first polarization and the second patch antenna in the second polarization and to transmit a radar signal via one of the first and second patch antennas and to receive the reflected radar signal via the other of the first and second patch antennas.

In some embodiments, the antenna array comprises four patch antennas, wherein the controller is operable in a first mode to configure the beamforming antenna to transmit and/or receive two RF communication signals and in a second mode to transmit two radar signals and receive two reflected radar signals.

In some embodiments, in the first mode the controller is operable to configure two patch antennas in a first polarization to respectively transmit and receive a first RF communication signal and to configure two patch antennas in a second polarization to respectively transmit and receive a second RF communication signal.

In some embodiments, in the second mode the controller is operable to configure two patch antennas in a first polarization to respectively transmit a first radar signal and receive a first reflected radar signal to configure two patch antennas in a second polarization to respectively transmit a second radar signal receive a second reflected radar signal. The second reflected radar signal is typically a reflection from the second radar signal. However, it may, in other embodiments, be a reflection from the first radar signal.

In some embodiments, the antenna array comprises tile of a plurality of patch antennas arranged in an array having m rows and n columns and wherein the controller is configured to configure each patch antenna in the same one of a first polarization and a second polarization.

In some embodiments, the antenna array comprises an array of four tiles and the controller is operable to configure any of: (i) a first tile to transmit a RF communication signal in the first polarization and a second tile to transmit a RF communication signal in the second polarization; and (ii) all tiles to transmit or receive RF communication signal in one of the first polarization and the second polarization; and (iii) two tiles to transmit a RF communication signal in the first polarization and two tiles to transmit a RF communication signal in the second polarization; and (iv) two tiles to receive a RF communication signal in the first polarization and two tiles to receive a RF communication signal in the second polarization.

In some embodiments, the antenna array comprises an array of four tiles and the controller is operable to configure any of: (i) all tiles in one of the first polarization and the second polarization and to further configure two tiles to transmit a radar signal and the other two tiles to receive a radar signal; and (ii) a first tile to transmit a first radar signal in the first polarization, a second tile to receive the first radar signal in the first polarization, a third tile to transmit a second radar signal in the second polarization, and a fourth tile to receive the first radar signal in the second polarization, each radar signal having the same frequency; and (iii) all tiles in one of the first polarization and the second polarization, a first tile to transmit a first radar signal, a second tile to receive the first radar signal, a third tile to transmit a second radar signal and a fourth tile to receive the first radar signal, wherein the first and second radar signal have different frequencies.

In some embodiments, the radar signal may include a frequency which is the same as the RF communication carrier signal frequency.

In some embodiments, the radar signal may include a frequency which is a factor two reduction of the frequency of the RF communication carrier signal.

In some embodiments, the antenna system may be included in a RF communications apparatus wherein the antenna system is configurable as an imaging radar sensor, a RF communications antenna or a combined imaging radar sensor and RF communications antenna.

The antenna system may be included in a mobile communications base stations for communications networks operable according to standards developed by the 3$^{rd}$ Generation Partnership Project 3 GPP™.

In a second aspect, there is provided a method of operating an RF apparatus in a mobile communications network, the RF apparatus comprising an antenna system for beamforming, the antenna system comprising a plurality of antenna patches and configurable as an imaging radar sensor, a RF communications beamforming antenna or a combined imaging radar sensor and RF communications beamforming antenna, the method comprising: configuring at least part of the antenna system to transmit a radar signal and receive a reflected radar signal; determining at least one parameter for use in channel estimation from the received reflected radar signal; configuring at least part of the antenna system as a beamforming antenna to transmit and/or receive a communications signal; receiving and/or transmitting signals for at least one communication channel between a network element and user equipment.

In a third aspect, there is provided a method for operating a mobile network comprising a base station including an antenna system, the antenna system comprising an antenna array for beamforming, the antenna array configurable as any of an imaging radar sensor, a RF communications antenna or a combined imaging radar sensor and RF communications antenna, the method comprising: configuring at least part of the antenna system as an imaging radar sensor; transmitting a radar signal and receiving the reflected radar signal determining a radar image of the surroundings of the mobile communications base station from the reflected radar signal; determining at least one of a location of objects and a classification of objects from the radar image; configuring at least part of the antenna system as an RF communications antenna; transmitting and/or receiving at least one communications signal. The reflected radar signal may include at least one reflection from the transmitted radar signal.

In some embodiments, the method further comprises determining at least one parameter for use in channel estimation from the received radar signal from the classification and location of objects.

In some embodiments, the method further comprises determining that a user equipment is associated with at least one object; determining at least one channel communications path based on the location of the user equipment and the location of other objects in the radar image; and adapting the beam-steering of at least part of the antenna system to the direction of the at least one channel communications path.

In some embodiments, the method further comprises in response to none of the objects being a person, configuring the antenna system to reduce the power consumption.

In some embodiments, the method further comprises in response to classifying at least one of the objects as a person, adapting the transmit power of the antenna system in dependence on the location of the person.

In some embodiments, the method further comprises in response to classifying at least one of the objects as a person, activating at least one of a light and a camera in response to the person being within a predetermined range of the mobile communications base station.

In some embodiments, the method further comprises classifying at least one object as a vehicle; determining whether a user equipment is associated with the vehicle, and in response to determining that a user equipment is associated with the vehicle, transmitting a predetermined data set to the user equipment by means of the communication signal. In some embodiments, the predetermined data set comprises at least one of an advertisement, a map of objects identified in the radar image, and a hazard notification.

In some embodiments, the method further comprises determining whether to initiate a handover of a user equipment to an adjacent mobile communications base station from the radar image. A doppler measurement using the radar may be used to determine the speed of an object which together with location information may be used to determine whether the base-station should initiate a handover to the next cell.

In some embodiments, the method further comprises storing the location of each handover.

In some embodiments, the method further comprises determining whether to initiate a handover by comparing the current location identified from the radar image with a previously stored location.

In some embodiments, the method further comprises combining a radar image determined from a first base station with a radar image determined from a further base station.

In some embodiments, the method further comprises providing a map of objects from the radar image to an item of user equipment.

In a fourth aspect, there is provided a mobile communications base station comprising an antenna system, the antenna system comprising an antenna array for beamforming and a controller coupled to the antenna array and operable to: configure at least part of the antenna system as an imaging radar sensor; transmit a radar signal and receive the reflected radar signal; transmit the reflected radar signal information to a network apparatus; configure at least part of the antenna system as an RF communications antenna; and transmit and/or receive at least one communications signal. The reflected radar signal information may be the reflected radar signal data and/or information extracted from the reflected radar signal.

In some embodiments, the mobile communications base station is further configured to receive parameters for the beamforming or beam-steering of the antenna system from the network apparatus dependent on at least one of the location of objects and the classification of objects determined from the reflected radar signal.

In a fourth aspect, there is provided a mobile communications network apparatus configured to: receive a detected radar signal from a mobile communications base-station; determine a radar image of the surroundings of the mobile communications base station from the detected radar signal; determine a location of objects and a classification of objects from the radar image.

In some embodiments, the network apparatus is configured to transmit parameters for the beamforming or beam-steering of the antenna system to the mobile communications base station dependent on at least one of the location of objects and the classification of objects.

Embodiment of the mobile communications network apparatus and the mobile communications base station may be included in a mobile cellular communications network.

BRIEF DESCRIPTION OF THE DRAWINGS

In the figures and description like reference numerals refer to like features. Embodiments are now described in detail, by way of example only, illustrated by the accompanying drawings in which:

FIG. 10A shows an antenna system according to an embodiment.

FIG. 10B illustrates a detail of the transmit/receive chain for the antenna system of FIG. 10A.

FIG. 10C shows a plan view of an alternative arrangement of the antenna patches of the antenna system of FIG. 10A.

FIGS. 12A, 12B and 12C show different operational configurations of an antenna system with two patch antennas according to an embodiment.

FIGS. 13A, 13B, 13C, 13D and 13E show different operational configurations of an antenna system with four patch antennas according to an embodiment.

DETAILED DESCRIPTION

Figure 1:
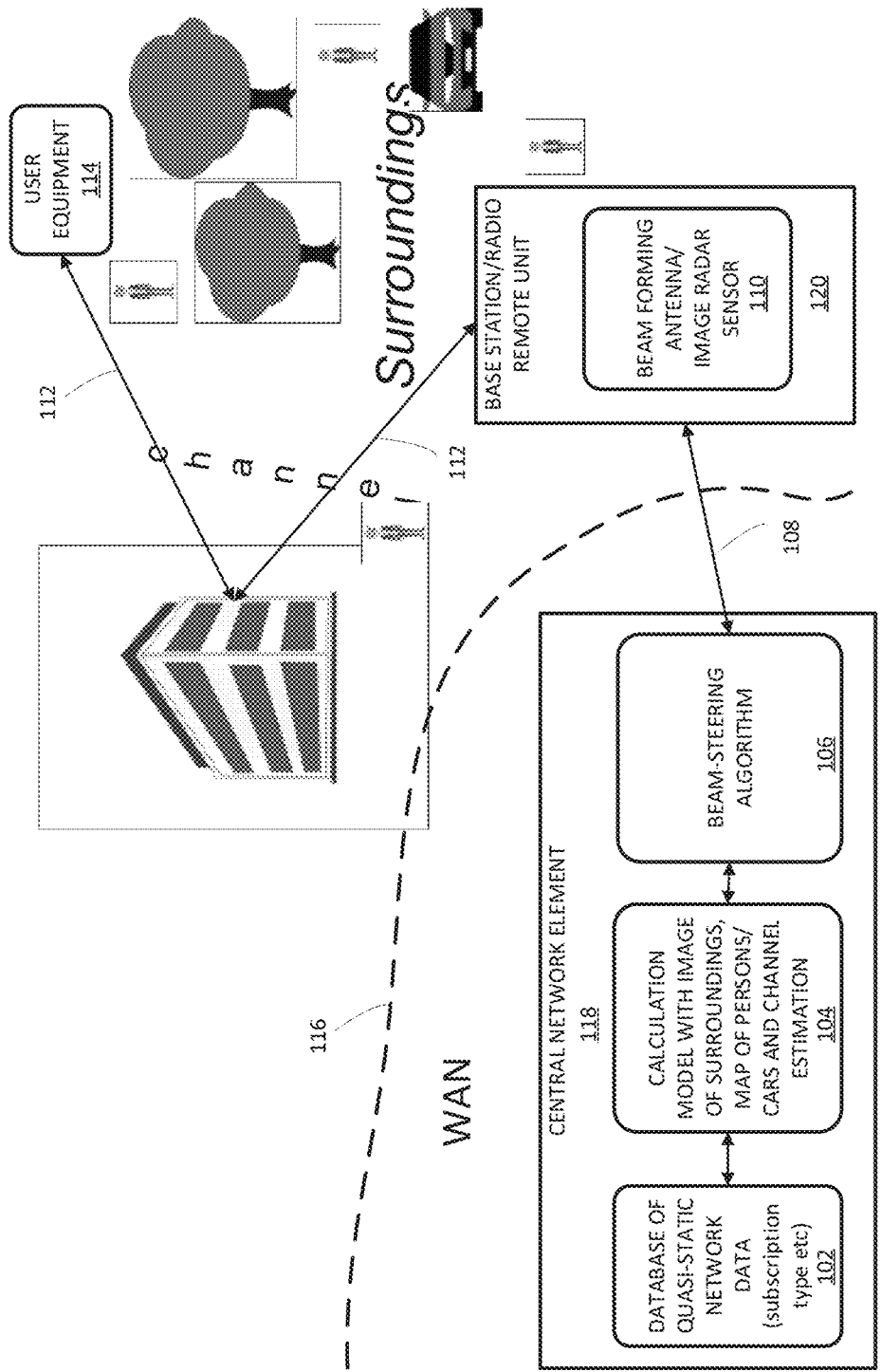
FIG. 1 shows a mobile communications network including a base station having an antenna system according to an embodiment.

FIG. 1 shows a mobile communications network 100 including a base station 120. The mobile communications network 100 may include a central network element 118 forming part of a wide area network (WAN) 116. The central network element 118 may be in communication via a link 108 with a base station or radio remote unit 120. The base station 120 includes a re-configurable antenna system 110.

The communications network 100 may be a time division duplex (TDD) communications network using millimetre wave communication. The antenna system 110 is configurable to form an imaging radar sensor which may provide information via data link 108 used by the central network element 118 to create a calculation model 104.

The antenna system 110 is also configurable as a beamforming antenna which builds one or more spatially selective communication channels 112 between the central network element 118 and various pieces of user equipment 114 or other base stations.

The calculation model 104 may provide a quasi-static physical model of the surroundings and a map of people and/or vehicles and other objects for example buildings, and trees which are present within the transmission range of the base station 120. The calculation model 104 may include channel estimations of the physical communication link between the base station 120 and the user equipment 114, and also may determine the position of the user equipment for example by triangulation using multiple (three or more) base station scanning to derive x,y,z co-ordinates. This may allow the user equipment to be correlated to the objects in the radar image to allow precise tracking of people and/or vehicles. These channel estimations may be used by the central network element 118 as input to a beam steering algorithm 106. The beam steering algorithm may be used to control the antenna system 110 to drive the spatial beam steering elements such that efficient use is made of line-of-sight properties i.e. direct path between the base station 120 and user equipment 114 with no physical obstacles but also and especially non-line-of-sight propagation path (reflections) of the millimetre wave communication system 100.

For example, as illustrated, channel 112 makes use of a non-line-of-sight path via a building. The central network element 118 may be implemented in hardware or a combination of hardware and software.

Example beam steering algorithms that may be used to control the beamforming may include delay and sum (Bartlett) or minimum variance beamforming algorithms. The antenna system 110 may be configured to optimise the highest data throughput at the lowest usage of electrical power.

The calculation model 104 may also include quasi static parameters available from the mobile communications network which may be stored in a database 102. These parameters may include for example the user subscription type which may define an expected data need and also give a priority of a channel for specific user equipment. Other parameters may include the time of day and the weather conditions or other environmental data which may be used as complimentary elements to optimise the beam steering algorithm 106.

The antenna system 110 may be re-configured between a radar mode of operation and a communications mode of operation in timeslots between (radar) image sensing and actual network-to-UE communication. The minimum required time may be allocated in a timeslot to create a sufficiently accurate image of the surroundings needed to determine the parameters for the channel estimation part of the calculation model 104. The channel estimation in turn may be used to optimise the channel link. In some examples part of the antenna system 110 may be used for radar image sensing simultaneously while other parts of the antenna system 110 are still being used for network-to-UE communication.

The inventors of the present disclosure have appreciated that for millimetre wave communication systems in particular millimetre wave communication systems using TDD such as 5G mobile communications networks, the antenna array used for communications may also be configured for use as a radar image sensor. Moreover, such a reconfiguration may not require any physical change to the antenna array, but may according to embodiments be effected by the provision of appropriate signals to one or more antennas in the antenna array. A radar image provided by such a radar image sensor may provide information to either reduce power consumption or improve communications quality and/or data throughput by improving channel estimation. The antenna system 110 may be configured such that at least part of the array is in a transmit mode and another part is in a receive mode. The frequency used for radar sensing may be the same or different than the carrier frequency used for RF communication. In some examples the frequency used for radar sensing may include a frequencies having any factor of two reduction of the RF communication frequency for example ½ or ¼ frequency. In some mm-wave systems the bandwidth of a signal may be 8 GHz in range of 92 GHz to 100 GHz. The radar signal may be a chirp signal or a chirp signal modulated with a code. In other words, the frequency of the radar signal may vary over time, or be fixed.

Figure 2A:
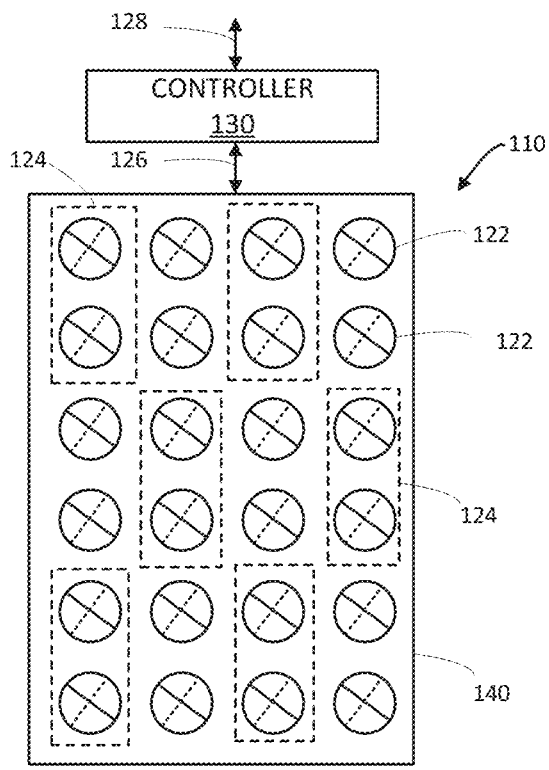
FIG. 2A shows the antenna system of FIG. 1 configured in a radar mode of operation.

FIG. 2A shows the antenna system 110 configured as a radar image sensor. The antenna system 110 includes a controller 130 and an antenna array 140 including an array of patch antennas 122 which may be dual-polarised. As illustrated the patch antennas 122 are circular as this has been found to give optimal performance. However in other examples different shapes of patches may be used for the patch antennas 122. The antenna array 140 shows a 4 by 6 array of antenna patches 122. However, it will be appreciated that in other examples fewer or more antenna patches may be used. In other examples, instead of or as well as patch antennas, an array of waveguide antennas may be used which may be referred to as launcher antennas. The controller 130 may control a transmitter/receiver chain (not shown) connected to each antenna patch 122. The controller 130 is connected to the antenna array via connection 126 which may include multiple separate connections with two connections per antenna patch 122. The controller 130 may be implemented in hardware or a combination of hardware and software. The controller 130 may send or receive control and communication data via connection 128 which may be sent to and/or received from the central network element 118.

Figure 2B:
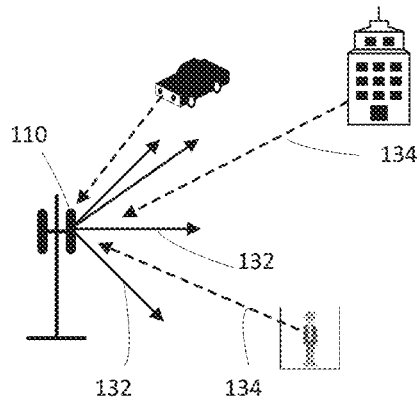
FIG. 2B shows the antenna system of FIG. 1 configured in a radar mode of operation.

The controller 130 may configure a subset 124 of the patch antennas 122 to either transmit a radar signal or receive a (reflected) radar signal. In other examples the controller 130 may configure half of the patch antennas 122 to each transmit a radar signal which may be the same signal, or different signals and the other half to detect reflected radar signal or signals. In other examples the number of patch antennas 122 used for transmission and detection may be different. In radar configuration, the antenna system 110 may use beamforming and beam steering to scan the environment to map objects. In other examples, the antenna system 110 may determine a radar image of the surroundings in all directions without beamforming. In other examples, beamforming may be used to scan the environment to map objects using a relatively narrow beam width. A narrow beam width may for example have a divergence of 5 degrees or less from the transmitting antenna. A wide beam width may have a divergence of 30 degrees or more from the transmitting antenna. FIG. 2B shows the antenna system 110 transmitting the radar signal 132 and detecting reflected radar signals 134 from various objects in the vicinity of the antenna system 110.

Figure 2C:
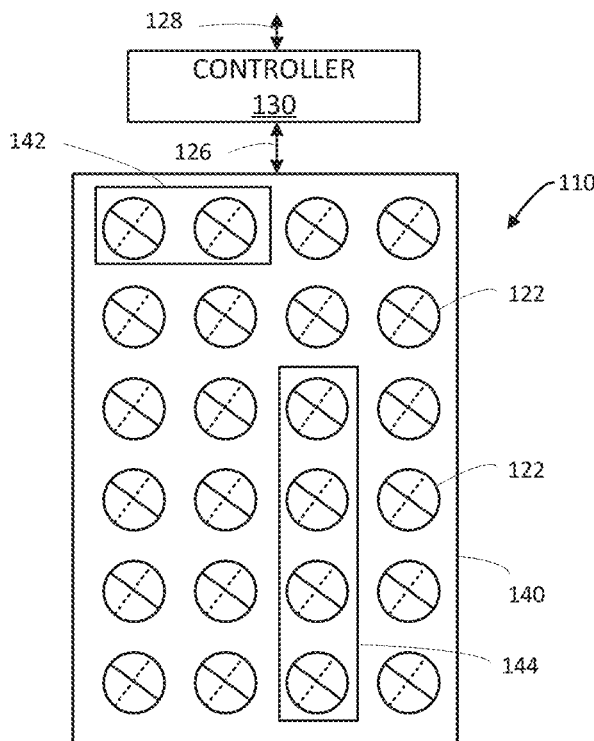
FIG. 2C shows the antenna system of FIG. 1 configured in a communications mode of operation.
Figure 2D:
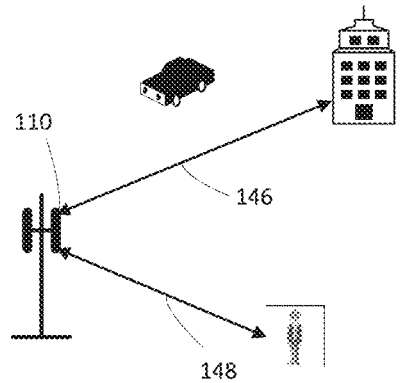
FIG. 2D shows the antenna system of FIG. 1 configured in a communications mode of operation.

FIGS. 2C and 2D show the antenna system 110 configured for communication. The controller 130 may configure a first beamforming antenna 142 having in the non-limiting example shown two antenna patches 122 forming a first communication channel 146. The controller 130 may configure a beamforming antenna 144 of the antenna array 140 and having in the non-limiting example shown four antenna patches 122 to form a second communication channel 148. Each of the first beamforming antenna 142 and the second beamforming antenna 144 may both transmit and receive communication signals.

Figure 3A:
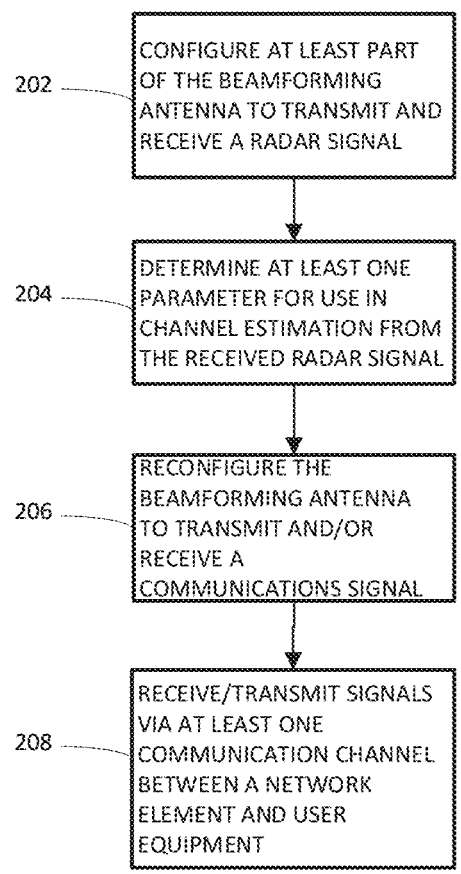
FIG. 3A shows a method of operation for an RF apparatus in a mobile network communication system according to an embodiment.

FIG. 3A shows a method 200 of operation for an RF apparatus in a mobile network communication system according to an embodiment. In step 202 at least part of a beamforming antenna may be configured to transmit and receive a radar signal. In step 204 at least one parameter may be determined for use in channel estimation from the received radar signal. In step 206 the antenna system may be reconfigured to transmit and/or receive a communication signal. In step 208, signals may be received or transmitted by at least one communication channel between a network element and user equipment using the antenna system.

Figure 3B:
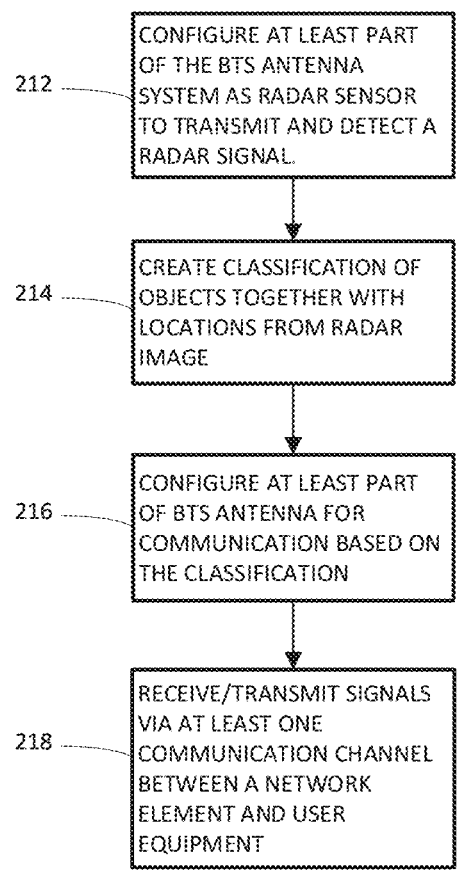
FIG. 3B shows a method of operation of a mobile network according to an embodiment.

FIG. 3B shows a method of operation 210 for a mobile network communication system according to an embodiment. In step 212 at least part of an antenna in a base-station may be configured to transmit and receive a radar signal so acting as a radar sensor. In step 214 a classification of objects and their locations may be determined from the radar image derived from the detected radar signal. In step 216 the antenna system of the mobile base station may be reconfigured to transmit and/or receive a communication signal. The reconfiguration may include updating beam steering and beamforming parameters using location and object information derived from the radar image. In step 218, signals may be received or transmitted by at least one communication channel between a network element and user equipment using the antenna system.

Figure 4:
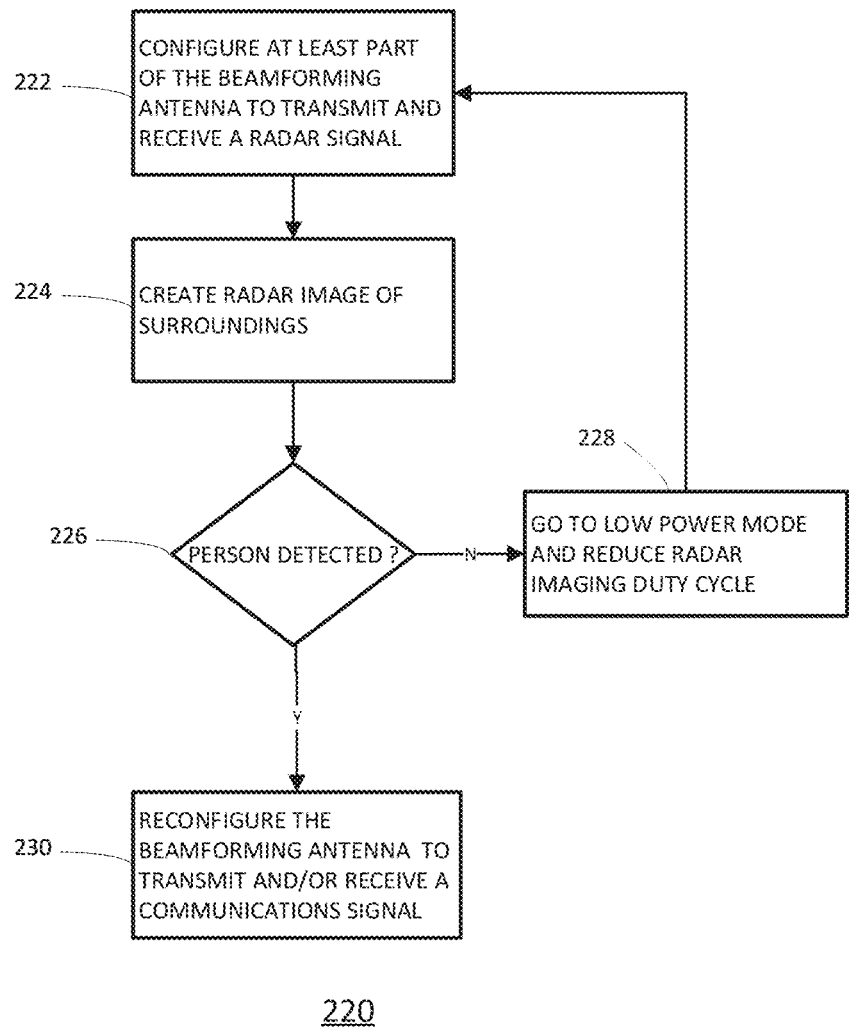
FIG. 4 illustrates a method of operation of a mobile network according to an embodiment.

FIG. 4 shows a method 220 of operating a mobile network including an antenna system according to an embodiment. The antenna system may be included in one or more base-stations. In step 222 at least part of a beamforming antenna may be configured to transmit and receive a radar signal. In step 224 a radar image may be created of the surroundings of the antenna system. In step 226 a check may be made to see whether a person has been detected based on the created radar image. If a person is not detected then the method proceeds to step 228 and the antenna system may go to a low-power mode and the radar imaging duty cycle reduced.

Alternatively, instead of reducing the radar imaging duty cycle, the radar mode may be used to track moving objects using progressive algorithms. For example, the radio signal strength indicator (RSSI) may be used to determine a location in time in conjunction with a location algorithm such as fingerprint calibrated weighted centroid (FCWC) such as used in Wi-Fi access points which use a beaconing signal. This algorithm can be made progressive to dynamically track user positions from successive radar images In this way, by configuring the antenna as a radar sensor and using the information provided by the detected radar signal, the power consumption of a base station or remote radio unit in a mobile communications network including the antenna system may be reduced. After step 228 method may return to step 222. If a person has been detected in step 226, the method may proceed to step 230 and the beamforming antenna may be configured to transmit and receive a communication signal.

Figure 5:
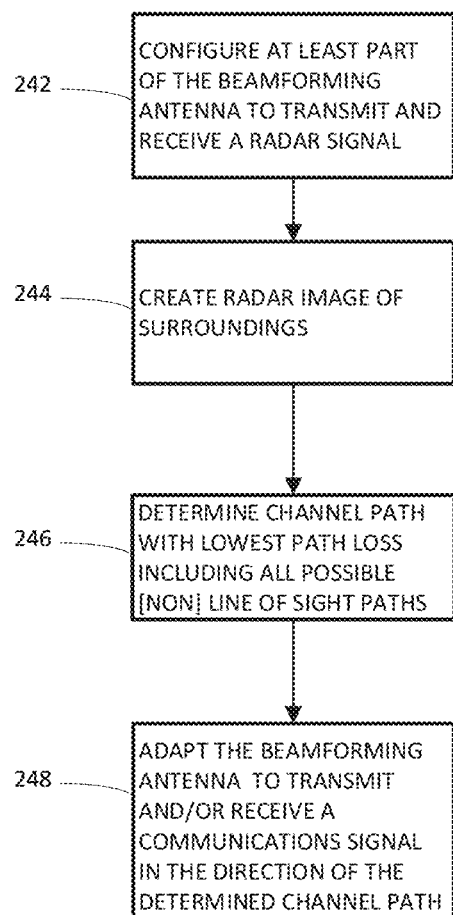
FIG. 5 shows a method of operation of mobile network according to an embodiment.

FIG. 5 shows a method 240 of operating a mobile network including an antenna system according to an embodiment. The antenna system may be included in a base-station. In step 242 at least part of a beamforming antenna may be configured to transmit and receive a radar signal. In step 244 a radar image may be created of the surroundings. In step 246 based on the determined radar image, a channel with the lowest path loss including all possible line-of-sight and non-line-of-sight paths may be determined. In step 248 the beamforming antenna may be reconfigured to transmit and/or receive a communication signal. The beamforming parameters used to configure the beamforming may be determined by the determined channel characteristics. Method 240 may result in a optimally selected channel path which may improve the quality of the communication channel and/or the data rate.

Figure 6:
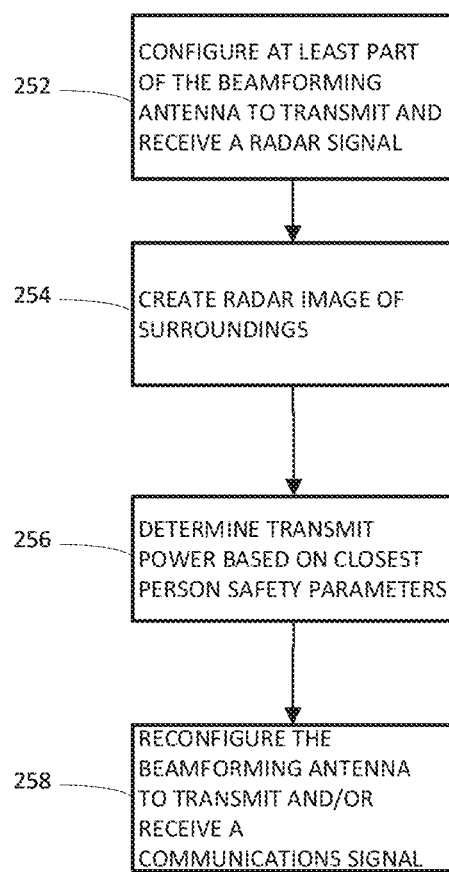
FIG. 6 shows a method of operation of a mobile network according to an embodiment.

FIG. 6 shows a method 250 of operating a mobile network including an antenna system according to an embodiment. The antenna system may be included in a base-station. In step 252 at least part of a beamforming antenna may be configured to transmit a radar signal and receive the reflected radar signal. In step 254 a radar image may be created of the surroundings from the reflected radar signal. In step 256 the maximum transmit power may be determined based on the closest person detected in comparison with predetermined safety parameters. In step 258 beamforming antenna may be reconfigured to transmit and/or receive a communication signal using the maximum power determined in step 256.

Figure 7:
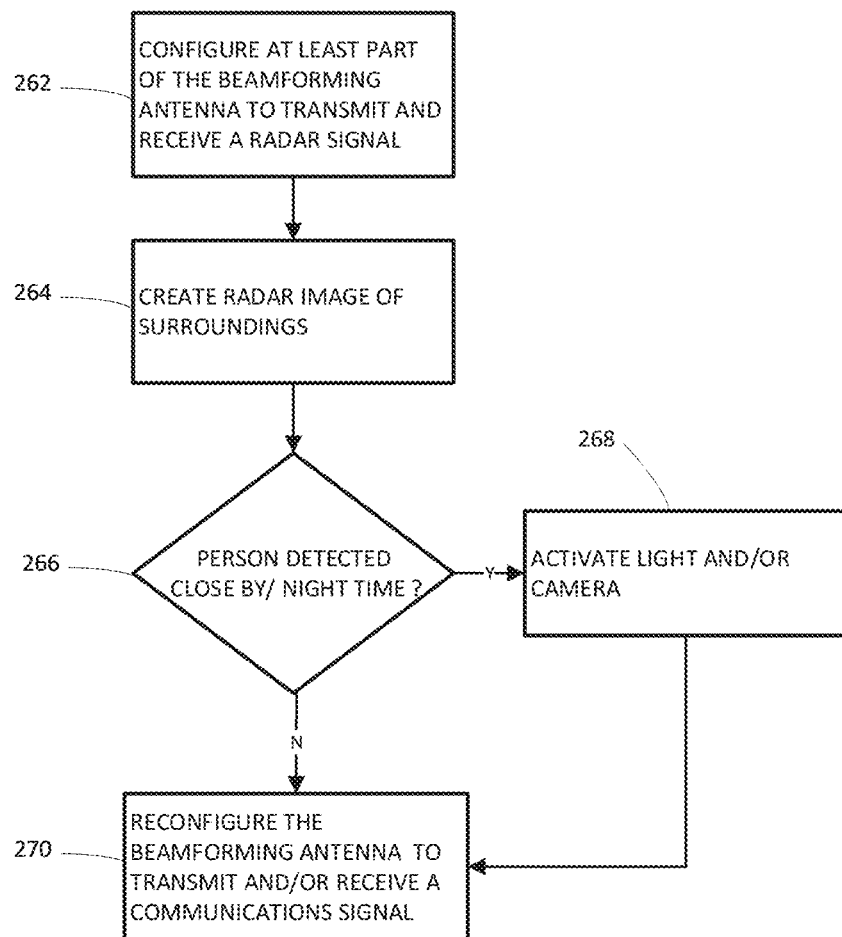
FIG. 7 shows a method of operation of a mobile network according to an embodiment.

FIG. 7 shows a method 260 of operating a mobile network including an antenna system according to an embodiment. The antenna system may be included in a base-station. In step 262 at least part of a beamforming antenna may be configured to transmit and receive a radar signal. In step 264 a radar image may be created of the surroundings. In step 266, a determination may be made whether a person is close by and whether based on the time information it is night time. If a person is close by and it is night time, the method moves to step 268 and a light and/or camera may be activated. This may be used for an antenna system when included in a base-station as a security provision. After step 268, the method may proceed to step 270 where the beamforming antenna is reconfigured to transmit and/or receive a communication signal. Returning to step 246, if a person has not been detected close by, the step proceeds directly to 250.

Figure 8:
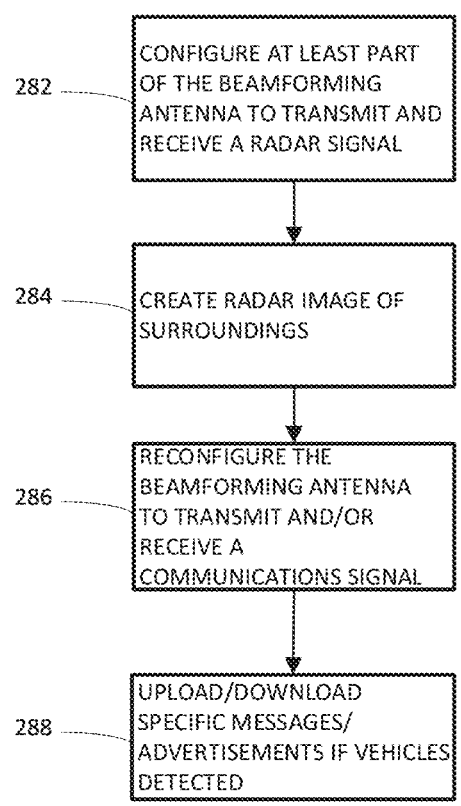
FIG. 8 illustrates a method of operation of a mobile network according to an embodiment.

FIG. 8 shows a method 280 of a mobile network including an antenna system according to an embodiment. The antenna system may be included in a base-station. In step 282 at least part of a beamforming antenna may be configured to transmit and receive a radar signal. In step 284 a radar image may be created of the surroundings. In step 286 the beamforming antenna may be reconfigured to transmit and/or receive a communication signal. In step 288 specific messages or advertisements may be uploaded or downloaded from the communication network. Alternatively or in addition, in some examples a map of objects determined from the radar image may be transmitted which may be used for navigation by a driver or by an autonomous vehicle. If cars or other vehicles are detected and any user equipment in the vehicles are activated, these messages may be transmitted to the user equipment.

Figure 9A:
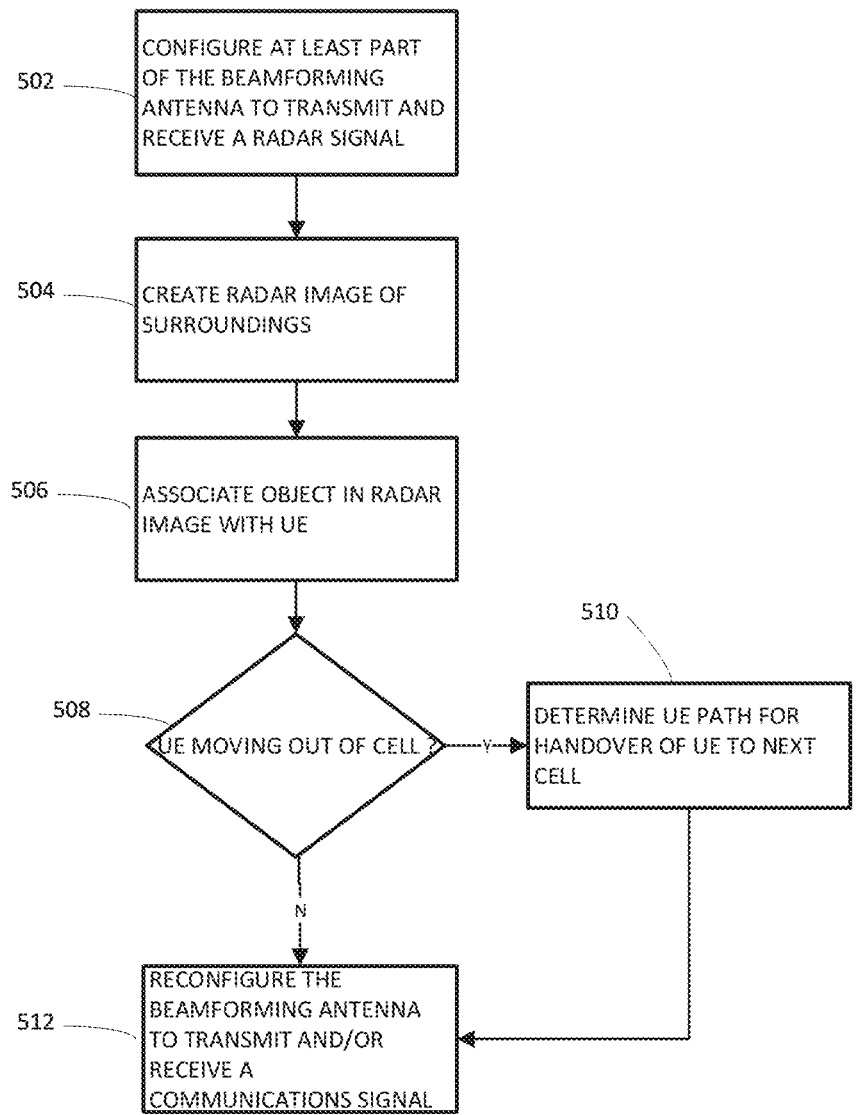
FIG. 9A illustrates a method of operation of a mobile network according to an embodiment.

FIG. 9A shows a method 500 of operating a mobile network including an antenna system according to an embodiment. The antenna system may be included in a base-station. In step 502 at least part of a beamforming antenna may be configured to transmit and receive a radar signal. In step 504 a radar image may be created of the surroundings. In step 506, an object in the radar image such as a person or vehicle may be associated with mobile user equipment (UE). In step 508, a determination may be made that a piece of user equipment is moving out of a cell of the cellular network. In one non-limiting example, this may be done from a comparison of the radar image with a previous radar image. If the UE is moving out of the cell, in step 510 the path of the UE is determined for example using velocity and the angular location of the UE. This information may then be used to identify the next cell for cell handover. The method then proceeds to step 512 and the beamforming antenna is reconfigured to transmit and/or receive a communications signal. Returning to step 508, if the UE is not moving out of the cell, the method proceeds straight to step 512.

Figure 9B:
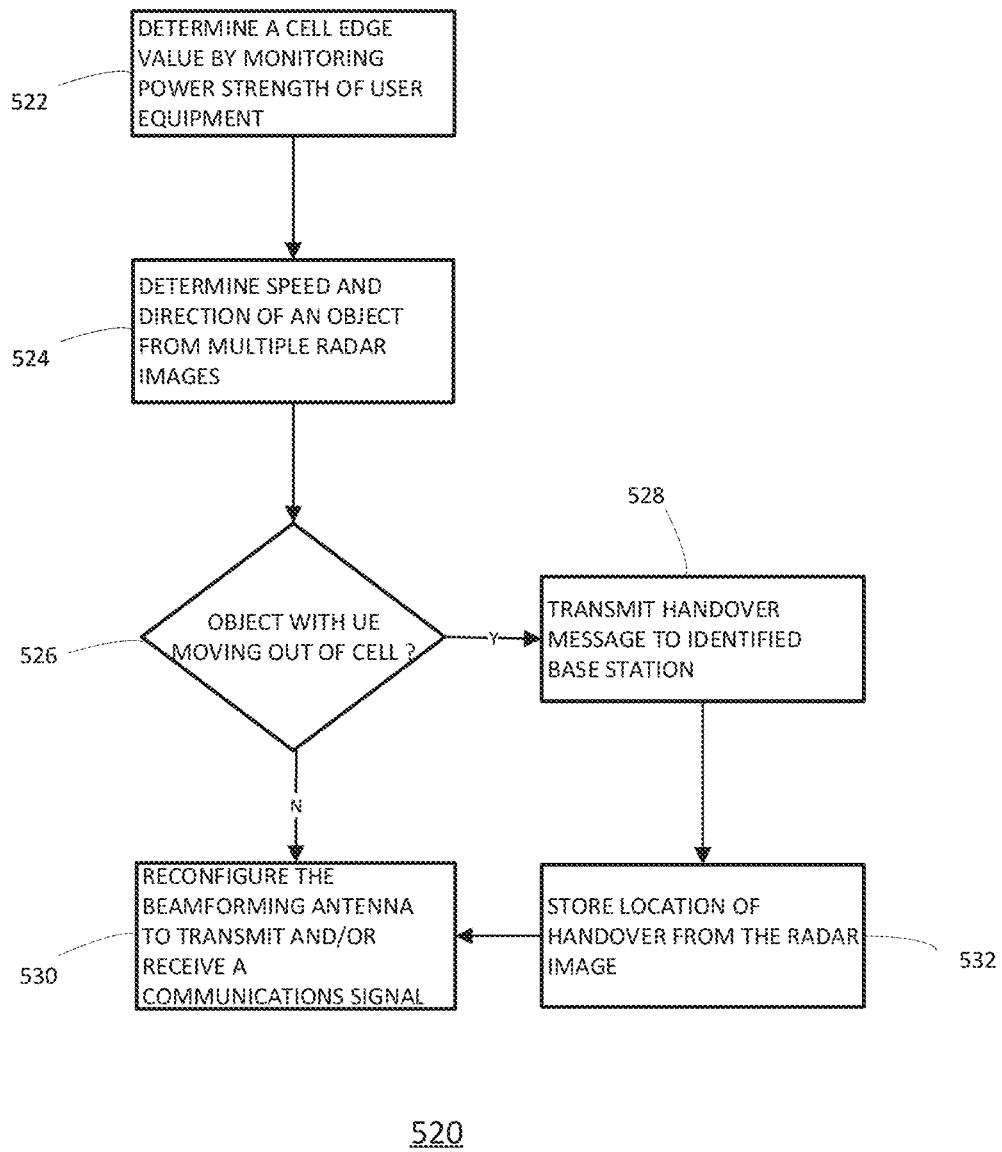
FIG. 9B illustrates a method of operation of a mobile network according to an embodiment.

FIG. 9B shows a method 520 of operating a mobile network including an antenna system according to an embodiment. The antenna system may be included in a base-station. In step 522 the cell edge, i.e. the maximum distance from the antenna system at which an UE may still effectively communicate with the antenna system, may be determined by monitoring the power strength of UE signals. In step 524 a determination of speed and direction of the object may be determined. A value of speed may be determined by the doppler shift of the frequency of the reflected radar signal compared with the transmitted radar signal. If a UE is associated with an object which may be determined by correlation of the object location determined from the radar image and UE position, a check may be made in step 526 if the object and therefore the UE is moving out of the cell. If the UE is moving out of the cell, in step 528 a handover message may be transmitted to an identified base station, being another base station in the network, generally in the vicinity towards which the UE is moving as it leave the cell, to instruct that base-station to take responsibility for communication with the UE. In step 532 the location of handover in the radar image may be stored. The method then proceeds to step 530 and the beamforming antenna is reconfigured to transmit and/or receive a communications signal. Returning to step 526, if the UE is not moving out of the cell, the method proceeds straight to step 530.

Figure 9C:
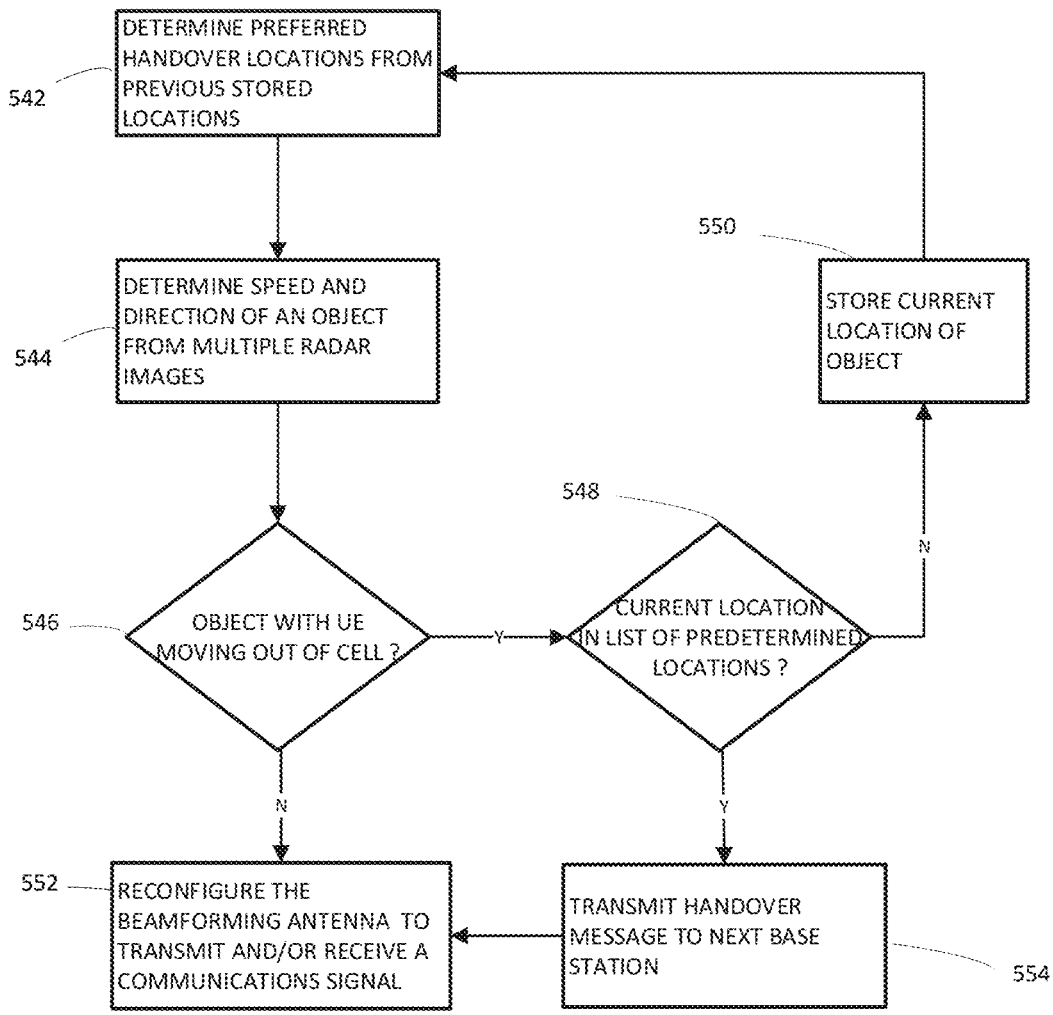
FIG. 9C illustrates a method of operation of a mobile network according to an embodiment.

FIG. 9C shows a method 540 of operating a mobile network including an antenna system according to an embodiment. The antenna system may be included in a base-station. In step 542 predetermined preferred hand over locations may be determined from previous stored locations as described in method 520. In step 544 a determination of speed and direction of the object may be determined for example using methods previously described. If a UE is associated with an object which may be determined by correlation of the UE location and the object location, a check may be made in step 546 if the object and therefore the UE is moving out of the cell. This check may be done for example by determining that the object, for example person or vehicle associated with UE through the communications network, is located at the predefined cell edge. If the UE is moving out of the cell, in step 548 a comparison is made between the current location of the object and the list of predetermined locations for handover. If the current location is in the list of predetermined locations, a handover message may be transmitted to the identified base station in step 554. The method then proceeds to step 552 and the beamforming antenna is reconfigured to transmit and/or receive a communications signal. Returning to step 546, if the UE is not moving out of the cell, the method proceeds straight to step 552. Returning to step 548, if the current location is not the list of predetermined locations, the location of the current object may be stored for subsequent evaluation in step 550 to determine whether it is a candidate for handover. The method then returns to step 542.

In some examples, radar images detected from multiple adjacent base stations may be combined to construct a more detailed image.

The antenna system may be reconfigured from long range to short range radar. A longer range radar may use lower frequencies but still be wideband for time resolution. A short range radar may use higher frequencies and/or greater bandwidth to limit self-interference due to other radar transmitters. For example, embodiments of the antenna systems may be configured as a long range radar using a frequency of 76 GHz to 77 GHz corresponding to a bandwidth of 1 GHz. Embodiments of the antenna systems may be configured as a short range radar using a frequency of 76 GHz to 81 GHz corresponding to a bandwidth of 4 GHz.

In some examples antenna panels may be configured to operate in a 'sparse operation' mode to avoid using adjacent antenna patches and/or use fewer patches. This may be done by altering the frequency to maintain a half lambda (wavelength) separation, for example by halving the frequency and then using every second patch.

FIG. 10A shows an antenna system 300 for a cellular network according to an embodiment. The antenna system 300 includes a controller 310, an antenna array 340, and a beam former 312 which may be an analog or digital or hybrid analog and digital beamformer. In some examples the beamformer may be part of the controller. The controller 310 may have a terminal 302 which may be a single wire or bus connection configured to receive or transmit communication signals and control parameters from and to a central network element (not shown). The controller 310 may have a connection 308 to the beam former 312 to send or receive communication or radar signals. The connection 308 may be a single wire or bus connection. The controller 310 may have a first control output 304 connected to a control input of RF transmit/receive chains 320*a-d*. The controller 306 may have a second control output connected to a control input of the beam former 312. The beam former 312 may be connected to respective RF terminals 314 a-d of each of the transmit/receive chains 320*a-d*. The antenna array 340 includes dual-polarized patch antennas 330*a-d*. A respective first feed-point of each of the patch antennas 330*a-d* is connected to a respective transmitter output 322*a-d* of the RF transmitter/receiver chain 320*a-d*. A respective second feed-point of each of the patch antennas 330*a-d* is connected to a respective receiver input 324*a-d* of the RF transmitter/receiver chain 320*a-d*.

FIG. 10B shows a transmit/receiver circuit 320 which may be used in each of the transmit/receiver channels 320*a-d*. The transmit/receiver circuit 320 includes an RF terminal 314 connected to RF switch 332. Control input of the RF switch 332 may be connected to control terminal 304 to select between transmit and receive paths. An input 334 of transmit amplifier 338 is connected to the RF switch 332. An output 336 of receiver amplifier 342 is connected to the RF switch 332. The output of the transmitter amplifier 338 is connected to the transmitter output 322. The input of the receiver amplifier 342 is connected to the receiver input 324.

FIG. 10C shows an alternative arrangement of the patch antennas 330*a* arranged in a grid rather than a linear array.

In operation the controller 310 may receive beam steering parameters via the communication interface 302. The controller may use the parameters control the beam former 312 to create one or more beams for communication channels using subsets of the patch antennas 322*a-d*. Alternatively, for example when a radar mode of operation is being used, the controller 310 may configure the beam former 312 such that no beamforming is performed i.e. no modification of the gain and/or phase of the different channels is done. The controller 310 may control whether the patch antennas are configured to transmit or receive signals by the control output 304. As illustrated a single control output is used to configure all of the patch antennas 330*a-d* to either be in a transmit mode or in a receive mode. However it will be appreciated that in other examples the controller 310 may be configured to independently control each transmit/receive channel 320*a-d* for example by replacing the single control connection 304 with a bus connection. In a communication mode, for a given communication channel, the controller 310 may configure a group of patch antennas 330*a-d* to time multiplex between transmit and receive to support TDD communication. The patch antennas 330 are typically dual polarised, the polarisation being determined by which feed point is used to transmit and receive. In a radar mode the controller 360 may configure a first subset of patch antennas 330*a-d* to transmit a radar signal which may be generated by the controller 360 and a second subset of patch antennas 330*a-d* to detect the reflected radar signal.

Figure 11A:
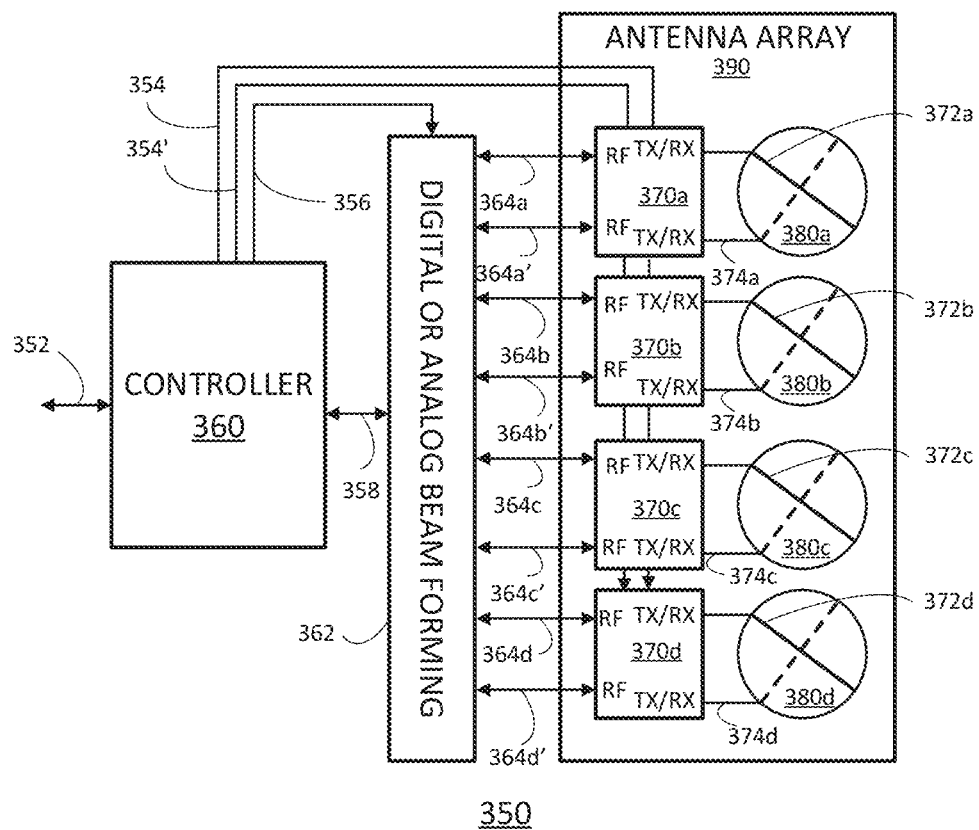
FIG. 11A shows an antenna system according to an embodiment.

FIG. 11A shows an antenna system 350 for a cellular network according to an embodiment. The antenna system 350 includes a controller 360, an antenna array 390, and a beam former 362 which may be an analog or digital beam former. In some examples the beamformer may be part of the controller. The controller 360 may have a terminal 352 which may be a single wire or bus connection configured to receive or transmit communication signals and control parameters from and to a central network element (not shown). The controller 360 may have a connection 358 to the beam former 362 to send or receive communication or radar signals. The connection 358 may be a single wire or bus connection. The controller 360 may have a control outputs 354, 354' connected to a respective control input of RF transmit/receive chains 370a-d. The controller 360 may have a control output 356 connected to a control input of the beam former 312. The beam former 312 may be connected to respective RF terminals 364a-d, 364a'-364d' of each of the transmit/receive chains 370a-d. The antenna array 390 includes dual-polarized patch antennas 380a-d. A respective first feed-point of each of the patch antennas 380a-d is connected to a respective transmitter/receiver terminal 372a-d of the RF transmitter/receiver chain 370a-d. A respective second feed-point of each of the patch antennas 380a-d is connected to a respective transmitter/receiver terminal 374a-d of the RF transmitter/receiver chain 370a-d.

Figure 11B:
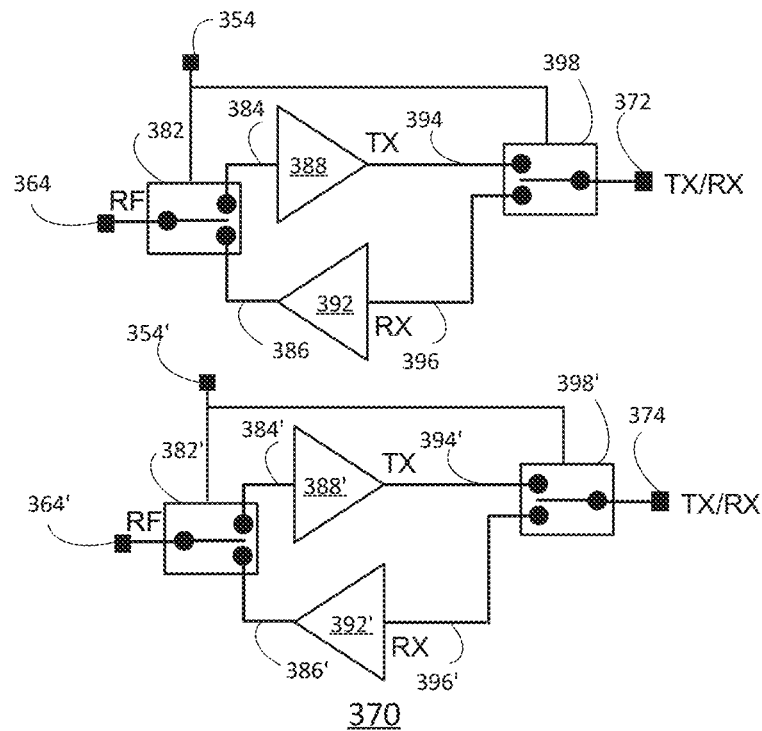
FIG. 11B illustrates a detail of the transmit/receive chain for the antenna system of FIG. 11A.

FIG. 11B shows a transmit/receiver circuit 370 which may be used in each of the transmit/receiver channels 370a-d. The transmit/receiver circuit 370 allows each feed-point of a patch antenna 380a-d to be connected for transmission or reception. The transmit/receiver circuit 370 includes two RF terminals 364, 364' connected to respective RF switches 382,382'. Control input of the RF switches 382, 382' may be connected to control terminals 354, 354' to select between transmit and receive paths for each channel. An input 384, 384' of each transmit amplifier 388, 388' is connected to respective RF switch 382, 382'. An output 386, 386' of each receiver amplifier 392, 392' is connected to respective RF switch 382, 382'. The output of each transmitter amplifier 388, 388' is connected to a respective second RF switch 398,398'. The input of each receiver amplifier 392,392' is connected to the respective second RF switch 398, 398". A first transmit/receive terminal 372 is connected to second RF switch 398. A second transmit/receive terminal 374 is connected to second RF switch 398".

In operation the controller 360 may receive beam steering parameters via the communication interface 352. The controller may use the received beam steering parameters to control the beam former 362 to create one or more beams for communication channels using subsets of the patch antenna 372a-d. Alternatively, for example when a radar mode of operation is being used, the controller 360 may configure the beamformer 362 such that no beamforming is performed. The controller 360 may control whether the patch antennas are configured to transmit or receive signals by the control outputs 354, 354'. As illustrated the control outputs 354, 354' are used to configure all of the patch antennas 380a—d to be in the same one of a transmit mode and a receive mode, for each feed point. However it will be appreciated that in other examples the controller may be configured to independently control each transmit/receive channel 370a-d for example by replacing the single control connections 354,354' with a bus connection. In a communication mode for a given communication channel, the controller 360 may configure a group of patch antennas 380a-d to time multiplex between transmit and receive to support TDD communication. The patch antennas 380a-d are dual polarised, the polarisation being determined by which feed point is used for transmitting and receive. In other examples patch antennas 380a-d may be configured to transmit in both horizontal and vertical polarization or to receive in both horizontal and vertical polarization. In a radar mode the controller 360 may configure a group of patch antennas 380a-d either to transmit a radar signal which may be generated by the controller 360 or to detect a radar signal.

FIGS. 12A to 12C show different configurations of an antenna system 400 with two dual-polarised patch antennas 402a, 402b according to an embodiment. The antenna system 400 may be configured by a controller (not shown). FIG. 12A shows a communications mode where the antenna 400 is configured as two antenna patches with one stream and two polarisations denoted respectively H for horizontal and V for vertical. It will be appreciated that the terms horizontal and vertical polarisation are used in a relative sense to indicate to orthogonally polarised streams. As illustrated, the antenna patches 402a, 402b may be configured to either receive in respective horizontal and vertical polarisation or to transmit in the respective horizontal and vertical polarisation. FIG. 12B illustrates an alternative configuration in a communications mode where the antenna system 400 may either receive or transmit in a single polarisation which may be either horizontal or vertical. In a radar mode of operation illustrated in FIG. 12C the antenna patch 402b is configured to receive only and the antenna patch 402a is configured to transmit only. Note that as shown in this and the following figures the direction of the arrows refer to the electrical feed to/from the antenna and not to the signal propagated in the air. Antenna patch 402a can therefore transmit a radar signal and antenna patch 402b can receive a reflected radar signal. Both the antenna patch 402a and the antenna patch 402b may be configured in the same polarisation.

FIGS. 13A to 13E show different configurations of antenna system 410 with four dual-polarised patch antennas 412a-d according to an embodiment. The antenna system 410 may be configured by a controller (not shown).

FIG. 13A shows a communication mode of operation which configures the four antenna patches 412a-d for two streams in two orthogonal polarisations. Patch antennas 412a and 412c may be configured to transmit or receive horizontally polarised signals. Patch antennas 412b and 412d may be configured to transmit and receive vertically polarised signals. In this configuration the antenna system 410 may receive horizontally and vertically polarised beams, one beam using antenna patches 412a and 412c and one beam using antenna patches 412b and 412d.

FIG. 13B shows an alternative communication mode of operation for antenna system 410 for two streams in two orthogonal polarisations having horizontal polarization for the antenna patches 412a and 412b and vertical polarization for the antenna patches 412c and 412d.

Figure 13C:
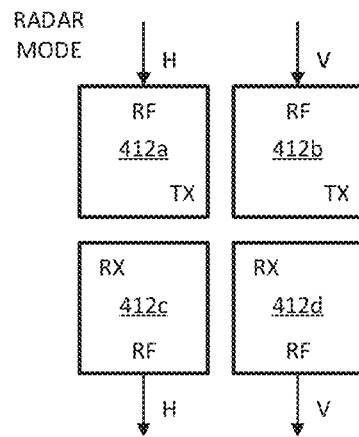

FIG. 13C shows a radar mode of operation for antenna system 410 in which patch antenna 412a is configured to transmit in horizontal polarisation, patch antenna 412b is configured to transmit in vertical polarisation, patch antenna 412c is configured to receive in horizontal polarisation, and patch antenna 412d is configured to receive in vertical polarisation. This may allow two different radar streams, one in horizontal polarised and one vertically polarised improving the resolution of the radar image. Alternatively instead of using different polarisations different frequencies for the two radar streams may be used.

Figure 13D:
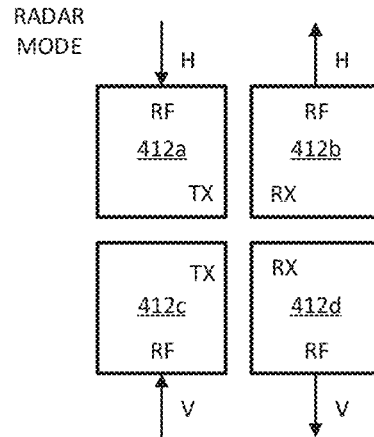

FIG. 13D shows an alternative configuration for a radar mode of operation for antenna system 410 to transmit and detect two radar streams in two different polarizations. Patch antenna 412a is configured to transmit in horizontal polarisation, patch antenna 412b is configured to receive in horizontal polarisation, patch antenna 412c is configured to transmit in vertical polarisation, and patch antenna 412d is configured to receive in vertical polarisation.

Figure 13E:
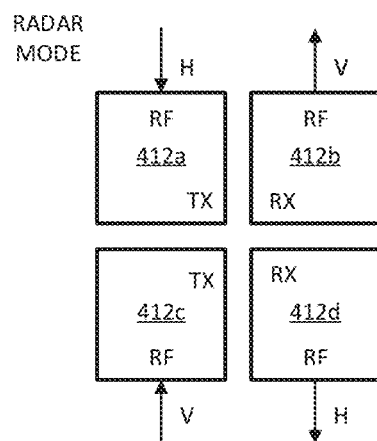

FIG. 13E shows an alternative configuration for a radar mode of operation for antenna system 410 to transmit and detect two radar streams in two different polarizations where the radar streams are positioned diagonally. Patch antenna 412a is configured to transmit in horizontal polarisation, patch antenna 412b is configured to receive in vertical polarisation, patch antenna 412c is configured to transmit in vertical polarisation, and patch antenna 412d is configured to receive in horizontal polarisation. Note that in this case the effective pitch between antenna patches is greater (by a factor of square root of two) than the pitch between directly adjacent patches, so the optimum frequency is correspondingly low by a factor of root two.

Figure 14A:
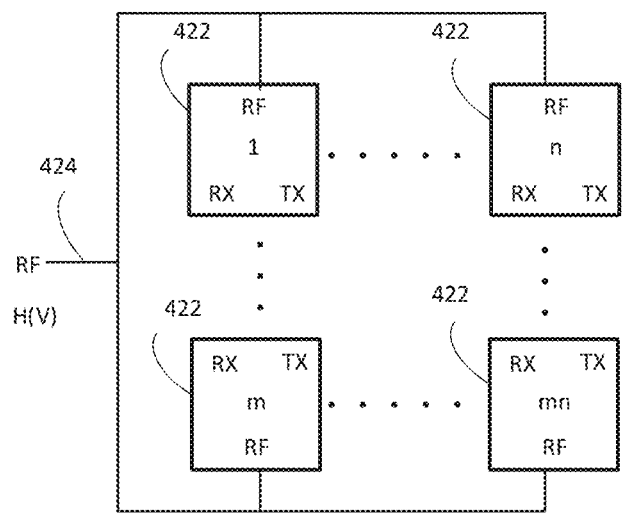
FIG. 14A shows a tile of patch antennas for an antenna system according to an embodiment.

FIG. 14A shows a tile 420 of m×n antenna patches 422 arranged in a grid of n columns and m rows connected to RF terminal 424. Each patch is polarized in transmit (TX) and receive (RX) so the tile 420 can be activated in one polarization and operated in transmit or receive. The tile 420 may effectively be resized by setting the transmit or receive mode of each antenna patch separately.

FIGS. 14B to 14G show different configurations of antenna system 430 with four tiles 420a-d and corresponding RF connections 424a-d according to an embodiment. The antenna system 430 may be configured by a controller (not shown).

Figures 14B, 14C:
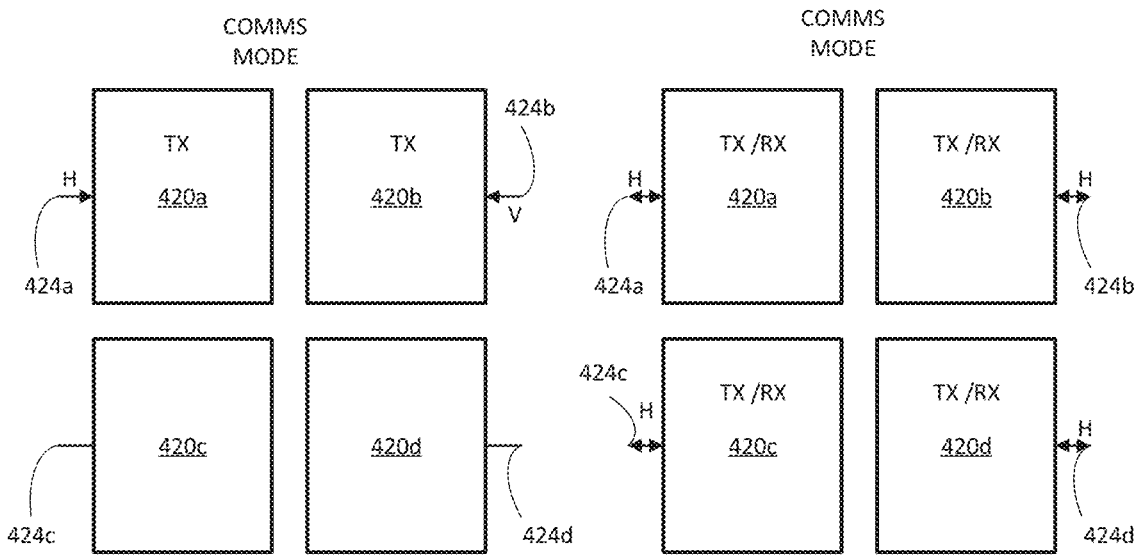
FIGS. 14B, 14C, 14D, 14E, 14F and 14G show different operational configurations of an antennas system including four tiles of FIG. 14A according an embodiment.

FIG. 14B shows a communications mode of antenna system 430 with m·n patches in tile 420a in transmit mode and horizontal polarization and m·n patches in tile 420b in transmit mode and vertical polarization. Tile 420a may form one beam and tile 420b may form another beam. In other examples (not shown) tile 420a may be configured in receive mode and horizontal polarization and tile 420b may be configured in receive mode and vertical polarization.

FIG. 14C shows a communications mode of antenna system 430 with all tiles 420a-d in transmit or receive mode in the same (horizontal) polarization.

Figures 14D, 14E:
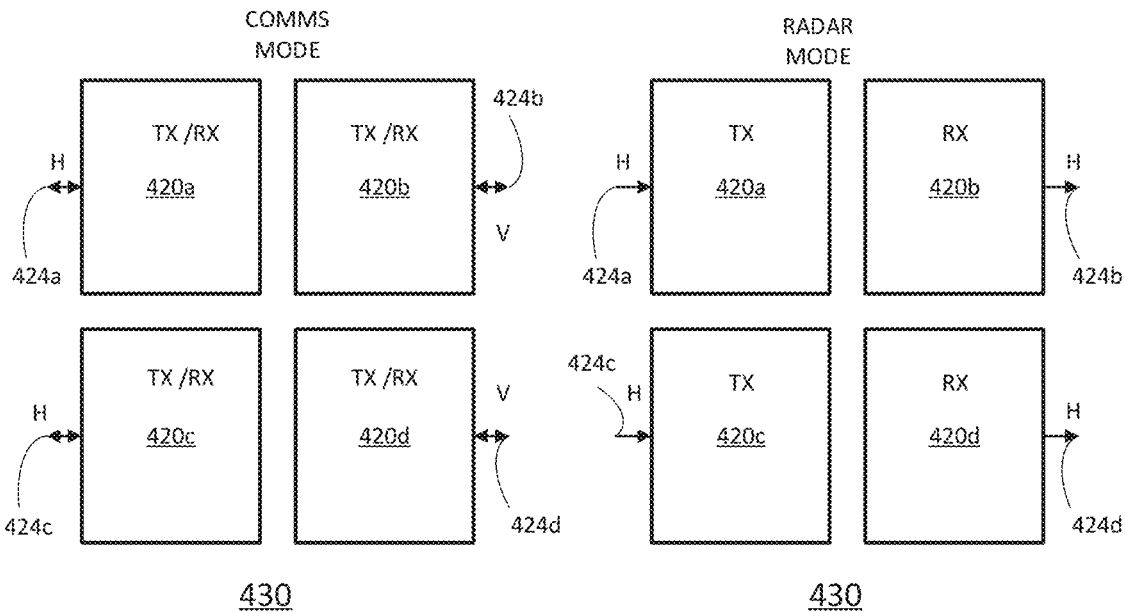

FIG. 14D shows a communications mode of antenna system 430 with two tiles 420a, 420c in transmit or receive mode in the same (horizontal) polarization and the other two tiles 420b, 420d configured in the other (vertical) polarization.

FIG. 14E shows a radar mode of antenna system 430 with two tiles 420a, 420c in transmit mode and the other two tiles 420b, 420d configured in receive mode in the same (horizontal) polarization.

Figures 14F, 14G:
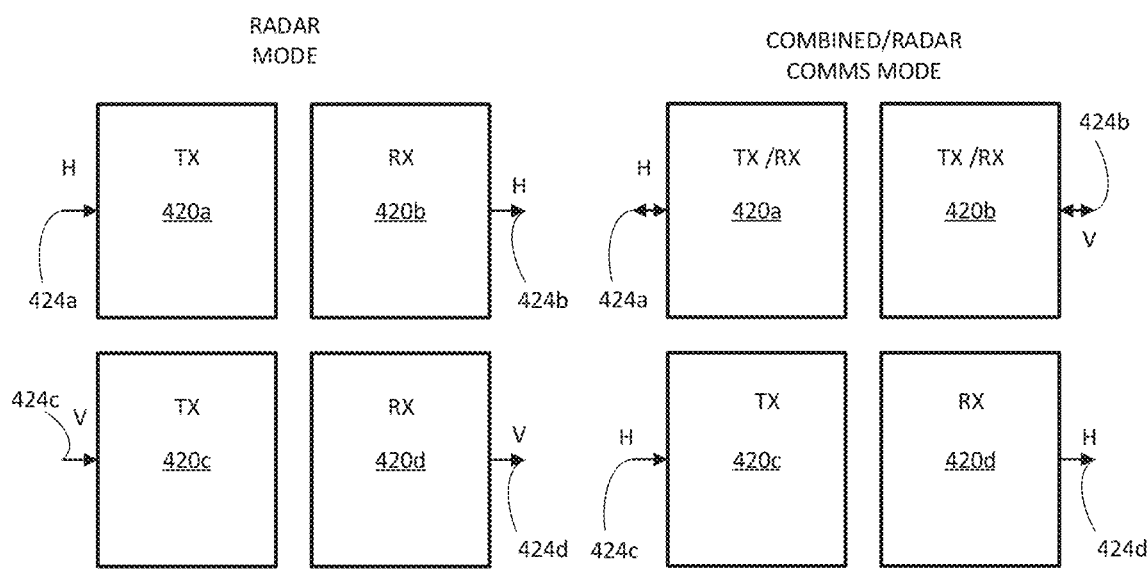

FIG. 14F shows a radar mode of antenna system 430 with tile 420a in transmit mode and tile 420b in receive mode in one (horizontal) polarization and tile 420c in transmit mode and tile 420d configured in receive mode in the other (vertical) polarization. Alternatively tiles 420c and 420d could be configured in the same polarization as tile 420a and 420b but use a different frequency.

FIG. 14G shows a combined mode of operation. In this mode the radar frequency may typically be different from the communications frequency to avoid interference. Tiles 420a and 420b may be configured to transmit or receive communication signals. Tile 420c may be configured to transmit a radar signal. Tile 420d may be configured to detect the reflected radar signal.

An antenna system for a mobile communications base station and a method of operating a communications network including a base station is described. The antenna system includes an antenna array for beamforming and is configured either as a radar sensor, a communications antenna or a combined radar sensor. A radar image may be used to determine a map of objects in the vicinity of the antenna system and to adapt the beam-steering or beamforming of the antenna system.

Example embodiments described may be included in base-stations, and other network apparatus for a mobile and/or wireless communications network. For example embodiments may by operable in mobile communications radio access networks (RAN) such as WCDMA or LTE operating according to standards including but not limiting to standards defined by 3GPP™. Example embodiments described herein may be implemented in hardware, software or combination of hardware and software.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. An antenna system for a mobile communications network base station, the antenna system comprising:
   an antenna array comprising a plurality of dual-polarized patch antennas; and
   a controller coupled to the antenna array for configuring each of the plurality of dual-polarized patch antennas to transmit or receive radio frequency (RF) signals, the controller being operable in a first mode and a second mode;
   wherein the controller, in the first mode, is operable to:
      configure a first antenna of the plurality of dual-polarized patch antennas to operate in either a transmit mode or a receive mode and in a first polarization; and
      configure a second antenna of the plurality of dual-polarized patch antennas to operate in either the transmit mode or the receive mode and in a second polarization;
      configure a third antenna of the plurality of dual-polarized patch antennas to operate in either the transmit mode or the receive mode and in the first polarization; and
      configure a fourth antenna of the plurality of dual-polarized patch antennas to operate in either the transmit mode or the receive mode and in the second polarization; and
   wherein the controller, in the second mode, is operable to:
      configure the first antenna to operate in only the transmit mode and in the first polarization; and
      configure the second antenna to operate in only the receive mode and in the first polarization.

2. The antenna system of claim 1, wherein the first polarization is orthogonal with respect to the second polarization.

3. The antenna system of claim 1, wherein the controller, in the second mode, is further operable to:
   configure the third antenna to operate in only the transmit mode and in the second polarization; and
   configure the fourth antenna to operate in only the receive mode and in the second polarization.

4. The antenna system of claim 1, wherein the controller, in the first mode, is operable to configure each of the first antenna and the second antenna to time multiplex between the transmit mode and the receive mode to support time domain duplex (TDD) communication.

5. The antenna system of claim 1, wherein the plurality of dual-polarized patch antennas are configured to transmit and receive radio frequency (RF) communication signals in the first mode and to transmit and receive radar signals in the second mode.

6. The antenna system of claim 5, wherein the antenna system is configurable as an imaging radar sensor, a RF communications antenna or a combined imaging radar sensor and RF communications antenna.

7. An antenna system for a mobile communications network base station, the antenna system comprising:
   an antenna array comprising a plurality of dual-polarized patch antennas; and
   a controller coupled to the antenna array for configuring each of the plurality of dual-polarized patch antennas to transmit or receive radio frequency (RF) signals, the controller being operable in a first mode and a second mode;
   wherein the controller, in the first mode, is operable to:
      configure a first antenna of the plurality of dual-polarized patch antennas to operate in either a transmit mode or a receive mode and in a first polarization;
      configure a second antenna of the plurality of dual-polarized patch antennas to operate in either the transmit mode or the receive mode and in the first polarization;
      configure a third antenna of the plurality of dual-polarized patch antennas to operate in either the transmit mode or the receive mode and in a second polarization; and
      configure a fourth antenna of the plurality of dual-polarized patch antennas to operate in either the transmit mode or the receive mode and in the second polarization; and
   wherein the controller, in the second mode, is operable to:
      configure the first antenna to operate in only the transmit mode and in the first polarization; and
      configure the second antenna to operate in only the receive mode and in the first polarization.

8. The antenna system of claim 7, wherein the controller, in the second mode, is further operable to:
   configure the third antenna of the plurality of dual-polarized patch antennas to operate in the transmit mode and in the second polarization; and
   configure the fourth antenna of the plurality of dual-polarized patch antennas to operate in the receive mode and in the second polarization.

9. The antenna system of claim 7, wherein the first polarization is orthogonal with respect to the second polarization.

10. The antenna system of claim 7, wherein the controller, in the first mode, is operable to configure each of the first antenna and the second antenna to time multiplex between the transmit mode and the receive mode to support time domain duplex (TDD) communication.

11. The antenna system of claim 7, wherein the plurality of dual-polarized patch antennas are configured to transmit and receive radio frequency (RF) communication signals in the first mode and to transmit and receive radar signals in the second mode.

12. The antenna system of claim 11, wherein the antenna system is configurable as an imaging radar sensor, a RF communications antenna or a combined imaging radar sensor and RF communications antenna.

13. A method of operating an RF apparatus in a mobile communications network, the RF apparatus comprising an antenna system for beamforming, the antenna system comprising a plurality of dual-polarized patch antennas, wherein the antenna system is and configurable as an imaging radar sensor, a RF communications beamforming antenna or a combined imaging radar sensor and RF communications beamforming antenna, the method comprising:
   configuring, in a first mode, a portion of the antenna system as a beamforming antenna to transmit and receive communications signals by:
      configuring in the first mode, a first antenna of the plurality of dual-polarized patch antennas to operate in either the transmit mode or the receive mode and in a first polarization; and
      configuring, in the first mode, a second antenna of the plurality of dual-polarized patch antennas to operate in either the transmit mode or the receive mode and in the first polarization; and configuring, in the first mode, a fourth antenna of the plurality of dual-polarized patch antennas to operate in either the transmit mode or the receive mode and in the second polarization, receiving and transmitting signals, in the first mode, for at least one communication channel between a network element and user equipment;

configuring, in a second mode, the portion of the antenna system to transmit a radar signal and to receive a reflected radar signal by:

configuring, in the second mode, the first antenna to operate in only the transmit mode and in the first polarization; and configuring, in the second mode, the second antenna to operate in only the receive mode and in the first polarization; and determining, in the second mode, at least one parameter for use in channel estimation from the received reflected radar signal.

14. The method of claim 13, wherein configuring, in the second mode, the portion of the antenna system to transmit the radar signal and to receive the reflected radar signal further comprises:

configuring, in the second mode, the third antenna to operate in only the transmit mode and in the second polarization; and configuring, in the second mode, the fourth antenna to operate in only the receive mode and in the second polarization.

15. The method of claim 13, wherein the first polarization is orthogonal with respect to the second polarization.

* * * * *